July 30, 1963 W. T. WALTERS 3,099,746
THICKNESS MEASURING APPARATUS UTILIZING GAMMA RADIATION
Filed Sept. 28, 1959
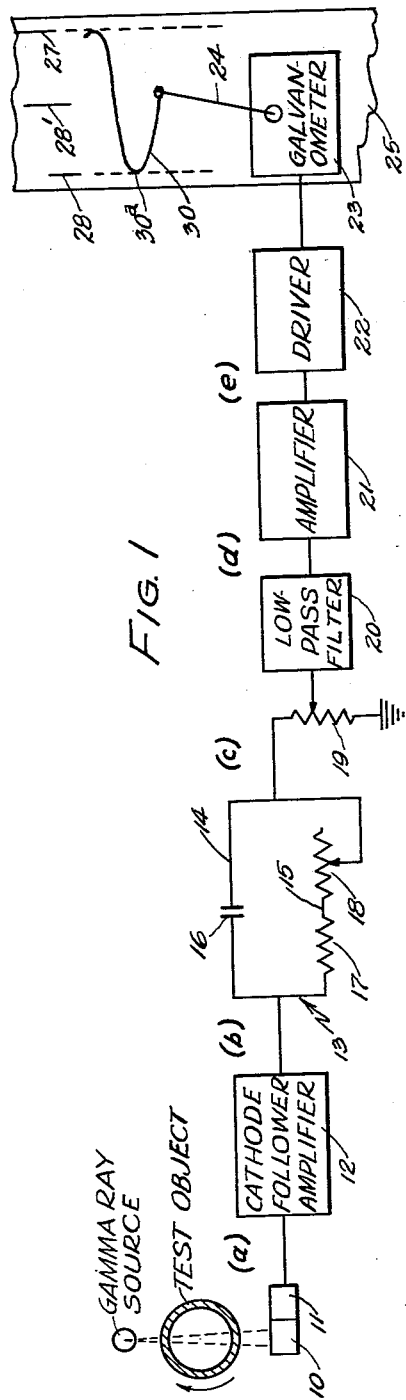
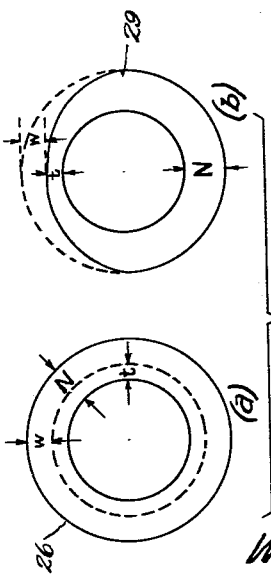
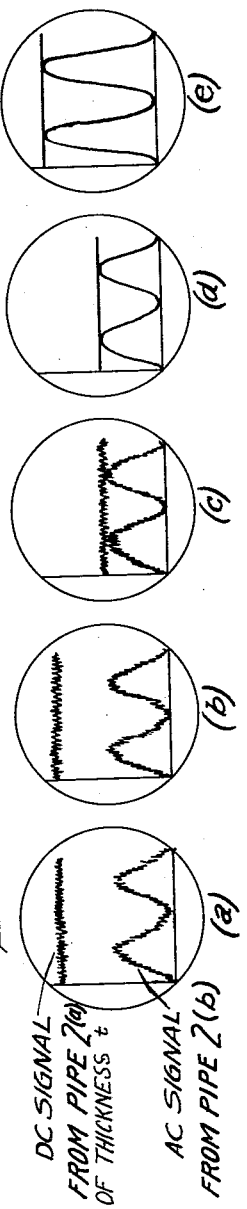
INVENTOR
WILLIAM T. WALTERS
BY Tom Arnold
D. C. Roylance
ATTORNEY

United States Patent Office 3,099,746
Patented July 30, 1963

3,099,746
THICKNESS MEASURING APPARATUS UTILIZING GAMMA RADIATION
William T. Walters, Houston, Tex., assignor to Tuboscope Company, Houston, Tex., a corporation of Delaware
Filed Sept. 28, 1959, Ser. No. 843,004
11 Claims. (Cl. 250—83.3)

This invention relates to measuring devices and, more particularly, to devies for non-destructive measurement of the wall thickness of a tubular member, such as a pipe.

When, for example, a pipe is used to convey highly pressurized fluids and the pipe is also subject to external wear, it is desirable to inspect and measure the wall thickness before the pipe is used or after it has been in use for a period of time. If the dimensions are unsatisfactory, then the pipe can be replaced. Here, it is necessary to first determine the limiting minimum dimension beyond which the pipe is not fit for the intended use and to thereafter reject all pipes which do not have at least this limiting dimension.

Prior-art workers have found that the thickness of a metallic member can be measured by passing a penetrating ray, such as a gamma ray, through the member and detecting strength of the ray after such passage. Since some of the ray is absorbed by the metal, the strength of that portion of the ray which passes through the metal is inversely proportioned by a roughly exponental function to the thickness of the metal traversed by the ray. (The formula for gamma ray is $I_d = I_0 b e^{-\mu x}$ where $I_d$ is ray intensity at the detector with pipe in place, $I_0$ is ray intensity at the detector with pipe absent, $b$ is a build-up factor which can be assumed to be unity when a sufficiently narrow beam is used as is preferred for this invention, $e$ is the base of the natural log, $\mu$ is the linear absorption coefficient, and $x$ is the pipe thickness.)

If such a penetrating ray is passed diametrically through a pipe or other tubular member, the strength of the emerging ray is a function of the total diametrical wall thickness. However, the critical dimension in regards to the strength of the pipe is not the total diametrical wall thickness at any one diameter, but rather the minimum radial wall thickness. It is accordingly an object of this invention to determine the radial wall thickness of a tubular member by detecting a penetrating ray passed diametrically through the tubular member.

In accordance with this invention, the penetrating ray may rotate relative to the tubular member in a plane substantially perpendicular to the tubular member. When the thickness of the wall of the tubular member under inspection is uniform for the full 360° of the rotation, the strength of the ray remains constant during such relative rotation; when the wall thickness varies from one side to the other of the member, the strength of the emerging ray varies. The variation occurs with a frequency dependent upon the speed of such relative rotation and in synchronism therewith; i.e., the variation occurs twice for each full revolution.

Further in accordance with this invention, the ray and member may move relative to one another in the direction axial of the pipe so that when one such plane has been inspected another plane just down the length of the pipe may be inspected on the next revolution. Preferably the rotational and axial movements are simultaneous and continuous so that the scanning of the pipe with the ray is in a sort of helical pattern rather than in discrete successive perpendicular planes. With such inspection, it is apparent that though there is no variation in wall thickness around the circumference of the pipe wall and thus no variation in ray strength during a 360° rotation, there may still be variations in wall thickness as the axial length of the pipe is scanned. These thickness variations along the length of the tubular member produce variations in the ray strength at frequencies other than twice the speed of rotation, and correlated to the occurrence of wall variation during the axial traversing of the pipe.

If the helix angle is small, as it must be for thorough scanning in a single pass down the pipe, the variation in ray strength due to the wall variations encountered in the axial movement along the pipe, are of lower frequency than twice the rotation speed. The importance of this is hereinafter explained.

As previously indicated, the strength of the emerging ray is a function of (and in that sense is proportional to) the total diametrical wall thickness of the tubular member traversed by the ray. If the wall thickness is uniform, the ray will traverse metal amounting to twice the uniform wall thickness. If the wall thickness is not uniform, the ray will traverse two diametrically opposed wall portions of unequal thickness. In the latter case, the thinner of the two portions may be well below the limiting minimum thickness; yet due to the magnitude of the thicker portion, the strength of the emerging ray is such as would indicate that no portion of the wall is thinner than the limiting minimum dimension. Thus, when tubular members having a non-uniform wall thickness are encountered, the results of a measurement of wall thickness by detecting the strength of a penetrating ray passed diametrically through the member tends to be ambiguous. Accordingly, it is another object to measure wall thickness of tubular members in the aforementioned manner without ambiguity when tubular members of non-uniform wall thickness are encountered.

A further object is to produce an accurate visual record or indication of the thickness of a member, or of the amount of normal thickness which is absent due to erosion or the like, in response to the strength of a penetrating ray passed through the member.

Yet another object is to provide a device in which two signal components obtained from passing the ray through a test member are electrically modified for direct expression of the metal gone, or of the wall thickness left, without interpolation or interpretation of the different meanings to be attributed to one component's amplitude as contrasted to the other.

A still further object is to provide a device of the type described which may be first calibrated to produce a reference point against which direct readout of all components of the signal can be obtained and which readout is a function of wall thickness.

In order that the manner in which these and other objects are attained, in accordance with the invention, can be understood in detail, reference is to be made to the accompanying drawings, which form a part of this specification, and wherein:

FIGURE 1 is a schematic diagram of a preferred embodiment of a measuring device constructed in accordance with this invention;

FIGURE 2 is a series of diagrams referred to in explanation of the operation of the device of FIGURE 1, and FIGURE 3 is a series of graphs illustrating some of the principles of operation of the device in FIGURE 1.

Referring now to the drawings, and first to FIGURE 1, it will be seen that a gamma ray source is arranged to direct a narrow ray through a tubular test object, the direction of the ray being at right angles to the longitudinal axis of the test object. As it emerges from the pipe, the ray impinges on a pickup or detector means. Provision is made for relative rotation between the test object and the ray, either by rotating both the source and the detector around the pipe, or by rotating the pipe within the path of the ray.

The pickup means comprises a scintillation crystal 10 operatively disposed adjacent to a photomultiplier tube 11. As the ray strikes the scintillation crystal 10, emissions are given off. The photomultiplier 11 is actuated in response to these emissions to produce an output signal proportional to (i.e. which is a function of) the strength of the ray as it emerges from the test object. Hence, the output signal of tube 11 is a function of the thickness of the test object as traversed by the ray.

Increased output indicates less metal, or more metal lost to erosion or otherwise not present; decreased output indicates more metal present. For each piece of pipe, some particular output ampltiude represents normal wall thickness, and outputs above that represent the degree of loss of normal wall thickness.

The output of the photomultiplier tube 11 is fed to the input of a cathode follower amplifier 12 which in turn, is connected to the input of an equalizer network, a preferred embodiment of which is indicated generally at 13, comprising two parallel branch paths 14 and 15. Branch 14 includes a capacitor 16, while branch 15 comprises the series combination of a fixed resistor 17 and a variable resistor 18. Branches 14, 15 are connected in parallel to one end of an adjustable resistance 19, the other end of resistance 19 being grounded. Branch 14, with capacitor 16, constitutes a low impedance path for A.C. signals and components of signals, while branch 15 provides a path for D.C. signals and signal components with resistances 17 and 18 constituting means by which the D.C. signals can be attenuated.

The adjustable contact of resistance 19 is connected to the input of a low-pass filter 20 which in turn is connected to the input of an amplifier 21. The output of amplifier 21 is connected to a driver 22 which in turn is connected to a galvanometer 23 for actuating a movable pen arm 24 cooperating with a movable strip chart 25 to produce a visual indication of the signal fed to the galvanometer. At any given instant, the position of the mark made on chart 25 is related to the strength of the ray at the pickup and thus the total metal traversed by the ray.

If a test object, such as the pipe 26 shown in cross-section in FIGURE 2(a), is placed in the path of the gamma ray, the strength of the ray emerging at the pickup is a function of the diametrical thickness. If the radial wall thickness is N and is uniform, then the diametrical wall thicknes is 2N. Even though there be relative rotation between pipe and ray, since the thickness N is uniform the output of tube 12 is relatively uniform and may be characterized as a D.C. signal or a D.C. component of the total signal. The galvanometer is constructed and arranged to move pen arm 24 and produce a mark at 27 on chart 25, the position of the mark corresponding to thickness 2N. As the chart moves by the pen the mark of course becomes the line 27.

Similarly, if the radial thickness of pipe 26 of FIGURE 2(a) is $t$ and uniform, the diametrical thickness is 2$t$. As shown $t$ is less than N by an amount $w$ so that the signal will be greater because less energy is absorbed in passing through pipe. Consequently a mark will be recorded on chart 25 at 28 and as the amplitude of the signal remains constant during movement of the chart a line is scribed at 28. The position of the line 28 corresponds to the thickness 2$t$; if 2N is normal for the pipe, the position of the mark 28 relative to the mark 27 corresponds to 2$w$, the metal not there as a result of faulty manufacture or of erosion in use, etc. Any uniform thickness between $t$ and N will result in production of a corresponding mark 28′ between marks 27 and 28.

Pipe 29, shown in cross-section in FIGURE 2(b), has a uniform radial wall thickness N throughout 180° and is non-uniform over the remaining 180°. At the top as viewed in FIGURE 2(b), the radial wall thickness is $t$. The difference between $t$ and N is $w$. When pipe 29 is tested with relative rotation between the gamma ray and the pipe, the signal produced includes a D.C. component corresponding to the uniform wall thickness $t$ which is present all the way around the pipe 29, and in addition includes an A.C. component corresponding to the variations in thickness between the minimum $t$ and the maximum N.

The frequency of this particular A.C. component is proportional to the angular velocity of the relative rotation between ray and pipe. As in all electronics equipment, random voltage fluctuations often referred to as "noise" may also be found in the total signal, the origins thereof being varied. Those "noise" fluctuations, which are of an A.C. nature, carry no intelligence. When they become of amplitude to be bothersome, they may be effectively controlled and some completely removed as by an appropriate filter 20.

In most body wall work, wherein small corrosion pits and the like are not the point of interest, the filter 20 may be a low pass filter set to cut off at a frequency 50% above twice the frequency of rotation of the ray relative to the tubular member.

It might be here noted further, that the ray may encounter concentric ring type wear, wherein the body wall is reduced uniformly around the pipe and in varying amount as the ray advances along the pipe. This condition introduces into what we characterize as the D.C. signal, variations which may be of an A.C. character but which must be interpreted on the same scale as the true steady D.C. Thus we can see that the interpreter must give different treatment to A.C. noise, to A.C. intelligence resulting from annular pipe wall variations, to A.C.-like variations in the D.C. resulting from variations in pipe wall encountered in the lengthwise movement along the pipe, and to the true steady D.C. And when all of the factors occur simultaneously, the interpretive problem in the absence of this invention becomes exceedingly difficult.

In accordance with this invention, however, the A.C. noise is filtered out, the A.C.-like component of the D.C. and the D.C. are both modified with respect to the A.C. intelligence from the variations encountered in the annular scan path so that all can be read on the same scale. The differentiation between the A.C.-like component of the D.C. and the A.C. as herein styled, can be made because by using a small helix angle in the scanning, the frequency of the A.C.-like component of the D.C. can be kept low enough to be substantially blocked by the condenser 16 whereas the A.C. itself is passed thereby.

The A.C. intelligence component (usually hereinafter referred to simply as "the A.C. signal" or "the A.C. component") along with the D.C. component (including the A.C.-like variations therein) pass through the equalizer network 13 or some equivalent thereof which will be apparent from this description to those skilled in the electronics art.

When the chart 25 moves at a uniform speed, a curve 30 is recorded which represents between peaks thereof, the variation in pipe wall thickness encountered by the ray. The lower peaks of the curve 30 (the right hand peaks in FIGURE 1) represent in relationship to the mark 27 whether any diametrically opposed wall portions are both of normal N thickness indicated by the mark 27. And as hereinafter further discussed, the upper peaks (left hand peaks in FIGURE 1) are indicative of either the thickness $t$ or absent metal $w$ when properly interpreted.

In study of the series of graphs of FIGURE 3 can be found further understanding of the invention.

There is indicated in FIGURE 3 a D.C. signal (with noise therein) which is typical in the subject type of inspection of pipe of uniform thickness less than normal, namely $t$. It may be assumed for purposes of this example, that $t$ represents the minimum wall thickness that can be tolerated for the particular use contemplated for the pipe. There is also indicated a separate signal appearing to be an A.C. signal and so designated though it includes a D.C. component as well, which is typical of pipe such as pipe 29 of FIGURE 2(b). Note that these signals are not simultaneously obtained and recorded in normal operation; rather we have here composited the two signals typical of different pipe conditions on a single chart for study purposes. The line at the bottom of the graphs (which is also D.C. in character) is indicative of what would be obtained from uniform normal thickness pipe.

Graphs (a), (b), (c), (d) and (e), respectively, represent these D.C. and so-called A.C. signals at the various points indicated in FIGURE 1 by the corresponding designators (a), (b), (c), (d) and (e) in that figure.

While the minimum thickness from each pipe sample represented by the two marks on FIGURE 3(a) is the same, namely $t$, the D.C. signal is of roughly twice the amplitude of the A.C. signal. This is true because the D.C. signal is a function of the thickness $(2N-2w)$ which is also $2t$, while the A.C. signal varies between limits corresponding to thicknesses of 2N $(2N-w)$. Thus, in one case, the signal is a function of $w$ and in the other case it is a function of $2w$.

Since a typical piece of pipe being inspected may have portions varying from uniform normal (N) to uniform $t$ to nonuniform between $t$ and N and even less than $t$, and less than N, and since a thickness $t$ in one context gives an indication which is twice that indicated by the same thickness $t$ in another context, the signal at this stage is ambiguous and confusing and likely to lead to a misunderstanding of the true condition of the pipe inspected. The signal at this stage is one upon which this invention contemplates improvement.

The relative amplitude of the D.C. signal, and of a selected easily readable portion of the A.C. signal, are modified so as to make both readable on the same scale with reference to the same base or normal body wall line, as percent of wall present or gone, or in inches of wall present or gone. Preferably the modification is such that the peak of the A.C. signal (including its D.C. component when there is some body wall all the way around, as hereinabove explained) and the D.C. signal are of the same amplitude for the same body wall thickness.

This can be conveniently done by appropriate amplification of the A.C. signal, but is usually more easily handled by passing the A.C. and attenuating the D.C. and one example of this latter embodiment of the invention is therefore the one chosen for illustration purposes herein.

The values of resistances 17 and 18 are so chosen that the D.C. signal and D.C. components of signals are attenuated for a given loss of pipe body wall, to the level of the A.C. signal for the same loss of body wall. While the amount of attenuation of the D.C. relative to the true A.C. component to effect direct reading of the A.C. peaks and the D.C. on the same scale of body-wall thickness or body-wall loss, is not obvious, it has been found to be a factor of three. That is, the D.C. should be attenuated three times the A.C. component (or in the alternative a circuit used by which the A.C. is amplified three times the D.C.).

A less preferred embodiment of the invention is to use a modification factor of two for such factor has been found to make the spread between peaks of the A.C. curve correlate with the scale used for the D.C. indication. The reason this embodiment is less preferred, is that the A.C. curve may move up and down on the chart with variations in the quantity of even wear accompanying the uneven wear, so the A.C. spread cannot be read directly from the chart unless the compensation is a scale printed on the chart unless the compensation is effective to equalize a portion of the A.C. curve such as its peaks, with the D.C. line, in terms of body wall present or gone.

Some may prefer to use a variable resistor 18 as indicated in the drawing, by which the instrument can be calibrated by trial and error with a test specimen of pipe. Alternatively the circuitry may be engineered before fabrication for the performance indicated so variable circuit components may be avoided thereby eliminating the possibility of erroneous readings being taken when the variable circuit component, such as the resistor 18, are inadvertently moved.

When the equipment is appropriately engineered, a base line representative of the normal pipe wall thickness can be printed on the chart and the galvanometer needle calibrated by a resistor such as 19 in FIGURE 1 to mark upon that line for normal body wall and above that line for any body wall less than normal. In accordance with this invention, both even and uneven absences of pipe wall may then be read directly on a single scale, which may be printed on the chart if desired, whereas in the absence of this invention, separate interpretation on differing scales is necessary in the interpretation of the A.C. signal and the D.C. component thereof.

And when an entire pipe surface is scanned by moving the ray axially along the length of pipe during the rotative inspection, this interpretative effort is occasionally confounded (in the absence of this invention) by variations along the pipe length in the amount of ring type wear of even character in the annular direction, whereby the D.C. component as it has been herein phrased takes on fluctuations of its own, i.e., assumes an A.C.-like component readable on a scale different from the scale used for reading the A.C. component heretofore discussed and referred to in the claims hereof.

It might be here observed that in both the factor-of-two and factor-of-three embodiments discussed, the amplitude of the A.C. and the D.C. signals are readable against the same scale. That is, $x$ inches of scale equals $y$ inches of body wall no matter whether A.C. or D.C. components are being measured. In the factor-of-two embodiment the scale is applied zero (the setting for normal wall thickness) to D.C. for the even wear reading and is applied A.C. high peak to A.C. low peak for the uneven wear reading; by contrast in the factor-of-three embodiment the scale is applied zero to D.C. for the even wear reading and without moving the zero is applied zero the high peak to effect the uneven wear readings respectively. So the scale is the same in either embodiment though its point of application is different in one as compared to the other.

To carry through the charts of FIGURE 3 consistent with the above, and the embodiment of the invention illustrated in FIGURE 1, we find the D.C. signal twice the A.C. signal's peak at (a) and (b). The compensating or equalizing network 13, however, reduces the D.C. for body wall $t$ to the same amplitude above the base line as the A.C. for the same body wall thickness $t$ as seen in (c). The filter 20 removes the "noise" which is apparent at (a), (b) and (c) and produces the cleaner signals illustrated at FIGURE 3(d). Finally the entire signal is amplified by whatever gain (positive or negative) may be convenient to fit the record of the particular galvanometer upon the particular chart size chosen, as indicated at (e).

Modifications may be made in the invention as particularly described above without departure from the scope of the invention.

Accordingly, the foregoing description is to be construed as illustrative only, and not as any limitation upon the invention as defined in the following claims.

In those claims references to A.C. signals and A.C. signal components are uniformly to variations resulting from the rotative scanning of the tubular member by the ray; and references to D.C. signals and D.C. components are intended to include low frequency variations therein which are not oscillatory in synchronism with the relative rotation between the tubular member and the ray, i.e., those variations resulting from wall variations along the length of the pipe rather than those around its circumference.

I claim:

1. In a device for determining the wall thickness of a tubular member, the combination of a penetrating ray source disposed outside said tubular member to direct a penetrating ray diametrically through the tubular member, detector means disposed on the opposite side from said source in the path of said ray and operative to produce a signal having both A.C. and D.C. components which signal is a function of the strength of the ray, said source and detector means being disposed for relative rotation with respect to said tubular member about the axis of the tubular member, circuit means operably connected to said detector means and effective to modify by the factor of three the relative amplitude of the D.C. and the A.C. components in the direction of reduction of the amplitude of the D.C. relative to the A.C., whereby the same amplitude of said D.C. and A.C. components become indicative of the same wall thickness, and means for indicating the resulting signal derived from said circuit means.

2. In a device for determining the wall thickness of a tubular member, the combination of a penetrating ray source disposed outside said tubular member to direct a penetrating ray diametrically through the tubular member, detector means disposed in on the opposite side from said source in the path of said ray and operative to produce a signal having both A.C. and D.C. components which signal is a function of the strength of the ray, said source and detector means being disposed for relative rotation with respect to said tubular member about the axis of the tubular member, circuit means operably connected to said detector means and effective to modify the relative amplitude of the D.C. and the A.C. components in the direction of reduction of the amplitude of the D.C. relative to the A.C. to the extent that both the A.C. components and the D.C. components can be read directly upon the same scale, and means for indicating the resulting signal derived from said circuit means.

3. In a device for determining the wall thickness of a tubular member, the combination of a penetrating ray source disposed outside said tubular member to direct a penetrating ray diametrically through the tubular member;

detector means disposed on the opposite side from said source in the path of said ray, said source and detector means being disposed for relative rotation with respect to said tubular member about the axis of the tubular member;

said detector means being operative upon the rotation to produce a signal having both a D.C. component responsive to variations in the strength in said ray due to variations in annularly even wall thickness, and an A.C. component of frequency equal to twice the annular velocity of said rotation and responsive to variations in the strength in said ray due to the varying wall thickness encountered during a revolution, circuit means operably connected to said detector means and effective to modify the relative amplitude of said D.C. component to said A.C. component, and means for indicating the resulting signal derived from said circuit means.

4. In apparatus for deriving an unambiguous indication of the radial wall thickness of a tubular member from an electrical signal obtained by passing a penetrating ray diametrically through both walls of said tubular member while causing relative rotation between the tubular member and the ray and detecting the emerging ray and including an indicator and circuit means connected to actuate said indicator in response to such detected ray; the combination therewith of means for modifying the relative amplitude of D.C. and desired A.C. components of such signal whereby the two components are readable in terms of tubular member wall thickness upon the same scale.

5. The invention defined in claim 4, wherein said modifying means is adapted to attenuate the D.C. component relative to the A.C. component by a factor of three.

6. The invention defined in claim 4 wherein said modifying means is adapted to attenuate the D.C. component relative to the A.C. component by a factor of two.

7. The invention defined in claim 4 wherein said modifying means is adapted to amplify the A.C. component relative to the D.C. component by a factor of two.

8. The invention defined in claim 4 wherein said modifying means comprises capacitance connected in parallel with resistance, said capacitance and resistance being of value to attenuate D.C. signal components passing therethrough in an amount three times the attenuation effected by such means upon frequencies in the range of twice the angular velocity of said rotation and thereabove.

9. In apparatus for the deriving of an unambiguous indication of the radial wall thickness of a tubular member by passing a penetrating ray diametrically through both walls of said tubular member while causing relative rotation between the tubular member and the ray and detecting the emerging ray and thereby deriving a signal with a component synchronous with such rotation, and including an indicator and circuit means connected to actuate said indicator in response to such signal; the combination therewith of means for modifying the relative amplitude of D.C. components of said signal with respect to components synchronous with such rotation, whereby the D.C. and the synchronous components are readable in terms of tubular member wall thickness upon the same scale.

10. The invention defined in claim 4 wherein said modifying means is adapted to amplify the A.C. component relative to the D.C. component by a factor of three.

11. In a device for determining the wall thickness of a tubular member, the combination of, a penetrating ray source disposed outside said tubular member to direct a penetrating ray diametrically through the tubular member;

detector means disposed on the opposite side from said source in the path of said ray and operative to produce a signal having both A.C. and D.C. components which signal is a function of the strength ray;

said source and detector means being disposed for relative roation with respect to said tubular member about the axis of the tubular member;

means for displaying a signal derived from said detector means; and means for modifying the relative amplitude of the D.C. component of said detector signal with respect to the A.C. component and connected to actuate the said display means with the modified signal, whereby variations in wall thickness are displayed and directly readable on an amplitude scale that is divided into segments proportional to units of wall thickness.

References Cited in the file of this patent

UNITED STATES PATENTS

| | | |
|---|---|---|
| 2,702,864 | McKee | Feb. 22, 1955 |
| 2,748,290 | Reichertz | May 29, 1956 |
| 2,859,349 | Bradley et al. | Nov. 4, 1958 |
| 2,952,774 | Howard | Sept. 13, 1960 |
| 2,964,630 | Bosch | Dec. 13, 1960 |